United States Patent [19]

Abel

[11] Patent Number: 4,768,555
[45] Date of Patent: Sep. 6, 1988

[54] SOLENOID VALVE

[75] Inventor: Stephen G. Abel, Chandler, Ariz.

[73] Assignee: Allied-Signal Inc., Morris Township, Morris County, N.J.

[21] Appl. No.: 45,009

[22] Filed: Apr. 30, 1987

[51] Int. Cl.$^4$ .......................................... F15B 13/044
[52] U.S. Cl. ................................. 137/627.5; 137/86; 137/596.17; 137/596.18
[58] Field of Search ................ 137/86, 596.17, 596.18, 137/627.5

[56] References Cited

U.S. PATENT DOCUMENTS 2,804,877  9/1957  Rosenberger ..................... 137/86 X
4,649,803  3/1987  Abel .

FOREIGN PATENT DOCUMENTS 171998  2/1986  European Pat. Off. ......... 137/627.5
1039550  8/1966  United Kingdom .................. 137/86

Primary Examiner—Gerald A. Michalsky
Attorney, Agent, or Firm—Terry L. Miller; James W. McFarland

[57] ABSTRACT

A two way closed-center solenoid valve provides effective areas upon the valve members which result in static pressure balancing of these members. Additional feedback areas are provided and exposed to fluid pressure which approximates a first time derivative of fluid pressure at an outlet port of the solenoid valve. Accordingly, an input signal is opposed dynamically approximately as a first time derivative of fluid pressure delivered to the output port. The feedback areas are larger in effective area than the effective areas upon the valve members to provide a favorable margin of feedback forces over static and dynamic frictions.

4 Claims, 2 Drawing Sheets

SOLENOID VALVE

BACKGROUND OF THE INVENTION

The field of the present invention is servo apparatus. More particularly, the present invention relates to servo apparatus of the type used to control or direct the course of a dirigible projectile or automotive vehicle, such as a torpedo or airborne missile. In such an application the servo apparatus is generally known as a fin actuator or control surface actuator, and is employed to move and selectively position a fin, rudder, or other movable control portion of the vehicle to affect the course of movement thereof in response to a control signal.

With still greater particularity, the present invention relates to novel valve apparatus having particular utility in servo apparatus of the above-described character. The inventive valve apparatus herein set forth may be employed to control a flow of pressurized compressible fluid from a source to a first receiver and from the first receiver to a lower pressure second receiver in response to respective input signals or commands.

When employed in a servo system of the above described character, the first receiver is a fluid pressure responsive motor driving the vehicle control portion, while the second receiver is a low pressure sump or vent to ambient pressure. The valve apparatus is operatively associated with, or integrally formed with, a transducing device which drives a portion of the valve apparatus between selected operative positions in response to input signals. By way of example, the input signals may be electrical voltage or current signals originating with a vehicle autopilot. In such a case, the transducing device may take the form of a solenoid coil, or of a Galvenometer movement coupled to the valve apparatus via force amplifying structure.

A conventional servo valve is known in accord with U.S. Pat. No. 2,505,981, issued May 2, 1950 to J. H. McLeod, Jr., wherein a pivotal input member is urged to alternative closed-centered, fill, or vent, positions by a balance of forces from four bellows members. Two of the bellows members cooperate to receive and exert fluid pressure differential input signal forces upon the input member. The other two bellows members cooperate to exert opposing output pressure and differentiated output pressure forces upon the input member. Accordingly, the servo valve is believed to be statically pressure balanced, and to be dynamically pressure imbalanced. As a result, the input signal forces are believed to be dynamically opposed by a time differentiated output pressure force.

However, the servo valve of McLeod, Jr., is very difficult and unwieldy in its construction. Many of the component parts of this servo valve must be mounted to support structure which is only cryptically disclosed. It is believed that reliable, precise operation of a servo valve as taught by McLeod, Jr., would be very difficult or impossible to achieve.

By way of example only, the mission requirements of a very high-speed dirigible automotive vehicle, such as an air-to-air missile, well illustrate a very challenging problem to a servo system. On one hand, missile launching and terminal phases of the mission require large, high-powered, frequent excursions of the missile aerodynamic control surfaces. These large excursions will be made in response to correlative input signals, and must be well damped and executed with stability and without overshoot. Such large excursions of the control surfaces are necessary to achieve launching of the missile while avoiding collision with the parent aircraft, and to successfully follow an evasive target.

On the other hand, cruising phases of the missile mission require only comparatively small and infrequent control surface movements for course correction. However, these small course-corrective movements must in fact be made by the servo system in response to small input signals. That is, if the small input signals are lost to servo system dead band or hysteresis, a course correction will be effected only after the course error has reached a higher level. The missile will then undesirably follow a wandering course.

In view of the above, it will be appreciated that each phase of operation of a high-speed dirigible automotive vehicle, of whatever type, requires differing characteristics of the control servo system. Launch and terminal mission phases require a low-gain, high powered servo system which is stable at high frequencies. Missile cruise, on the other hand, requires a high-gain, sensitive and responsive servo system which will effect small input signals.

However, it is believed conventional servo apparatus cannot satisfactorily fulfill the full range of requirements set out above. Conventional servo valves generally have a substantially flat gain curve as a function of input frequency. However, the control surface movement requirements outlined above, and other servo system applications, require a relatively high system gain at low frequencies and a gain decreasing as a function of input signal frequency. This requirement is not necessarily within the scope of conventional servo apparatus and servo valves.

SUMMARY OF THE INVENTION

In view of the above-outlined deficiencies of conventional servo valve apparatus, it is an object for the present invention to provide servo valve apparatus wherein imbalanced pressure forces within the valve apparatus are substantially eliminated within a selected input signal frequency band width.

In further view of the above, it is an object for the present invention to provide a servo valve apparatus where the input force dead band of the valve apparatus is substantially eliminated within the selected input frequency band width.

A concomitant objective for the present invention in view of the above is to provide a servo valve apparatus having an increased gain of output fluid pressure as a function of input signal magnitude within the selected band width of input frequency.

Still further, the present invention according to an object thereof is to provide a servo valve apparatus displaying a gain decreasing with input frequency above the selected input frequency band width to reach a lesser substantially constant gain at a determined input frequency and thereabove.

Accordingly, the present invention provides servo valve apparatus wherein a first valve member cooperates with an annular seat both to close communication between an inlet port and an outlet port and to define a first effective sealing area. The valve member movably cooperates with a housing both to close communication between the inlet port and a vent port and to define a second effective sealing area substantially equal with the first effective area so that the first valve member is pressure balanced. A second valve member sealingly cooperates with the first valve member to close communication between the outlet port and the vent port and defines a third effective sealing area substantially matching the first and second effective areas. An input member engages the second valve member to urge the second valve member into sealing engagement with the first valve member or to selectively allow unseating thereof, or to unseat the first valve member while maintaining sealing engagement of the valve members. The input member also sealingly and movably cooperates with a housing portion to define two concentric and opposed feedback effective areas. The first of the opposed feedback effective areas significantly exceeds the third effective area and is disposed to urge the first and second valve members into sealing engagement in response to fluid pressure thereon, while the other of the opposed effective areas defines an area substantially equal to the area difference between the first opposed effective area and the third effective area. The other opposed effective area freely communicates with the output port while the first opposed effective area is restrictively communicated with the outlet port so that fluid pressure effective thereon approximates a first time derivative of output port pressure. Therefore, the servo valve is substantially statically pressure balanced, while being dynamically pressure imbalanced according to a first time derivative of fluid pressure at the output port with a significant margin of dynamic feedback forces over static and dynamic frictions.

More particularly, the present invention comprehends servo valve apparatus of the two-way, closed-center type wherein an input member is movable to selectively communicate pressure fluid from an inlet to an outlet, or from the outlet to a vent, in response to respective input signals. The input member is subject to fluid pressure at the outlet to substantially pressure balance the valve apparatus. The communication of the input member with output fluid pressure is inhibited so that with rapid changes in output pressure the valve apparatus is not fully pressure balanced and exhibits a lessened gain and increased force dead band.

In view of the above, it will be seen that a number of advantages are offered by the present invention. For example, a servo valve according to the invention may utilize a lower powered input force transducer because the valve apparatus is substantially pressure balanced at relatively low input frequencies. Further, the valve apparatus according to the present invention, while displaying a relatively high gain at low input frequencies, has a diminishing gain with increasing input frequency so that the stability of a servo system including the servo valve is enhanced at higher operating frequencies of input signal. Still further, a servo system according to the invention has a high gain at low input frequencies so that infrequent input signals of low magnitude are not swamped out or lost to servo system inertia, dead band, or hysteresis, and are in fact effected by the servo system. Additionally, the preceding servo system includes, via the servo valve hereof, a negative feedback loop analogous to acceleration of the output member so that stability of the servo system at high input frequencies is enhanced, and overshoot is avoided.

DETAILED DESCRIPTION OF THE PREFERRED EMBODIMENTS OF THE INVENTION

Figure 1:
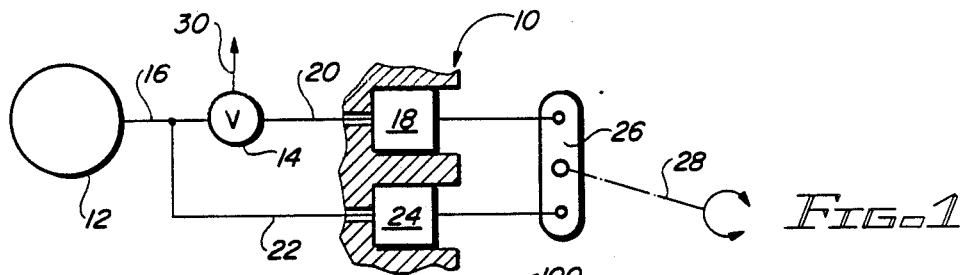
FIG. 1 schematically depicts a control system embodying the invention.

FIG. 1 schematically depicts a pneumatic control system 10 for selectively controlling an angular or pivotal position of a load member. Control system 10 includes a pressure fluid source 12 communicating pressurized fluid to a two-way control valve 14 via a conduit 16. The pressurized fluid selectively communicates from control valve 14 to a first variable-volume motor chamber 18 of greater effective area via a conduit 20. A second conduit 22 connects with conduit 16 intermediate of source 12 and valve 14 to communicate pressurized fluid to a second variable-volume motor chamber 24 of lesser effective area than chamber 18. The chambers 18 and 24 are bounded by piston heads connected to a centrally pivoted toggle member 26. The toggle member 26 mechanically connects at 28 for rotational torque transmission to a load member to effect pivotal movement thereof in response to expansion and contraction of the chambers 18,24.

In order to effect expansion of chamber 18 and concomitant contraction of chamber 24 with resulting load member pivotal movement via connection 28, valve 14 selectively provides communication from source 12 to chamber 18. Because the effective area of chamber 18 exceeds that of chamber 24, the latter is contracted while chamber 18 expands.

On the other hand, pivotal movement of the load member in an opposite direction is effected by selective closure of communication from source 12 to chamber 18 and concurrent venting of pressure fluid to ambient, as depicted by arrow 30. When the pressure level in chamber 18 drops sufficiently below that in chamber 24 to overcome the difference in effective areas therebetween, pivotal movement of the load in the sense resulting from expansion of chamber 24 and contraction of chamber 18 results.

To the extent described herein immediately above, the present control system generally corresponds to that of my previous application, U.S. ser. No. 641,104, issued on March 17, 1987 as U.S. Pat. No. 4,649,803, the disclosure of which is incorporated herein to the extent necessary for a complete understanding of the present invention.

Figure 2:
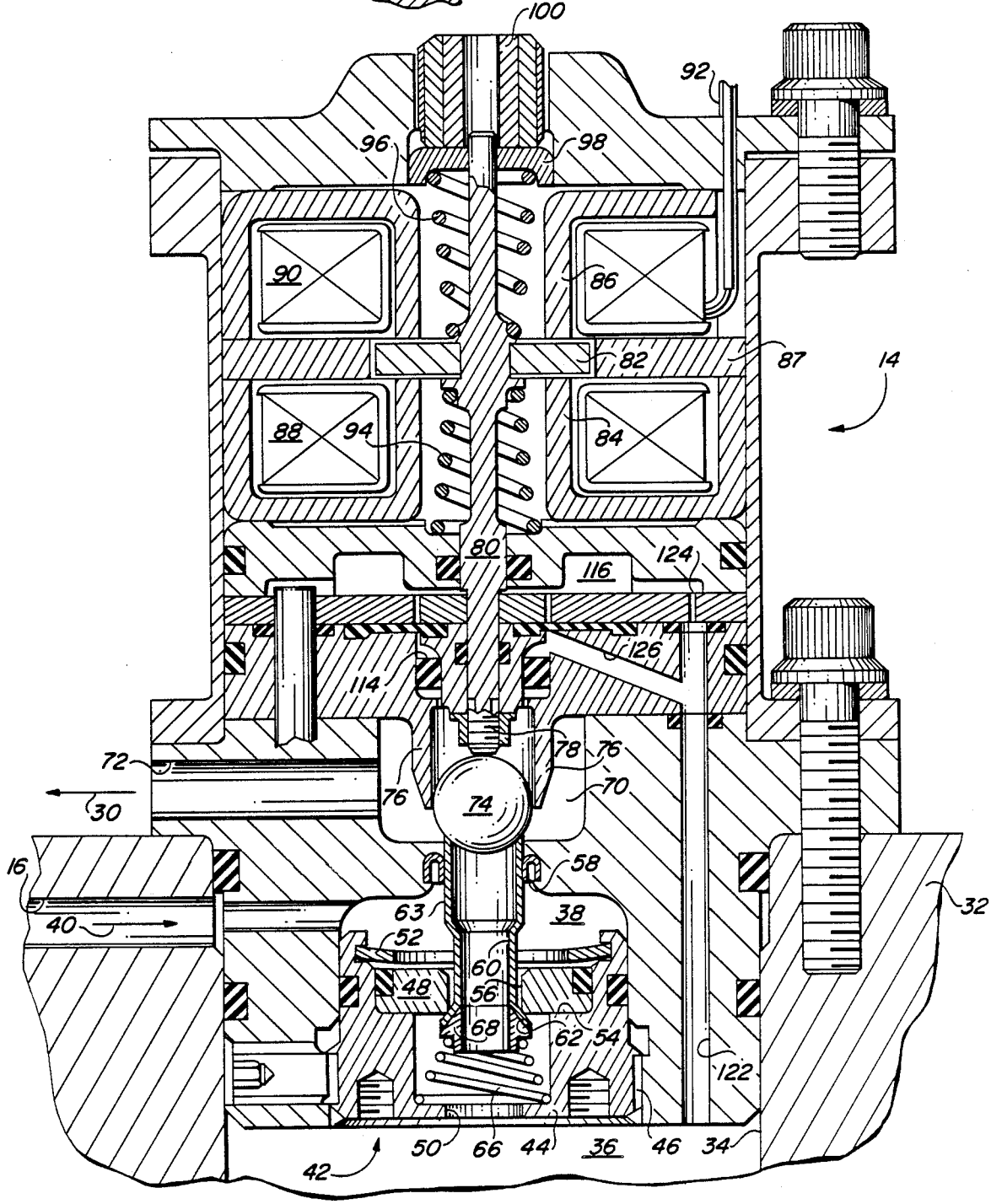
FIG. 2 provides a side view partially in cross section of a control valve portion of a control system embodying the invention.
Figure 2A:
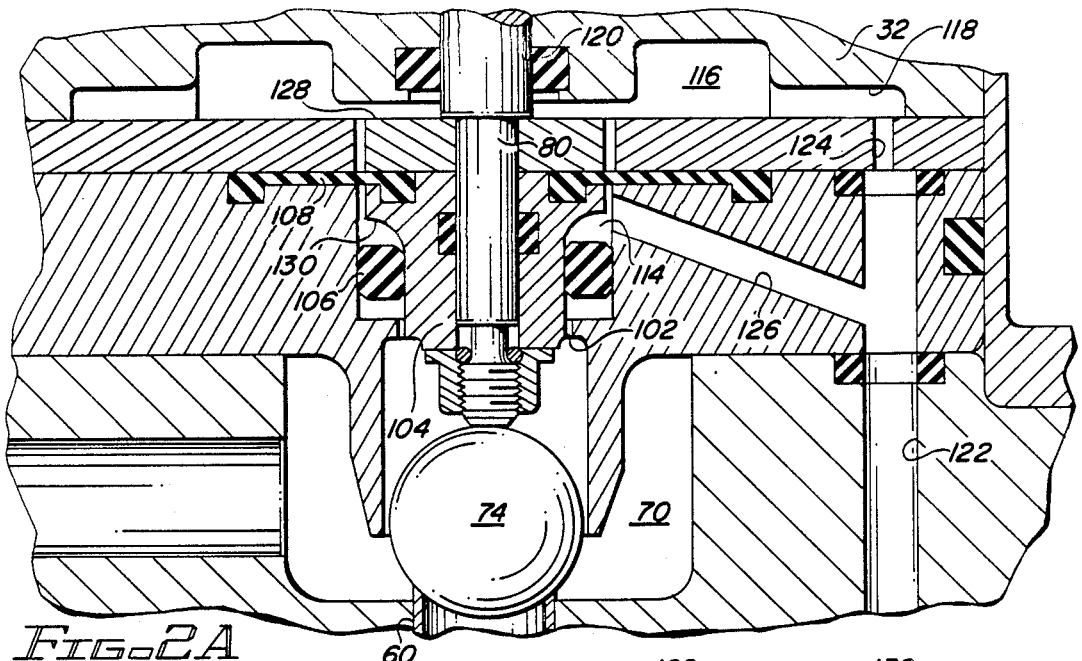
FIG. 2A depicts an enlarged fragmentary view of an encircled portion of FIG. 2.

As set out herein above, the present invention is directed to fulfilling objects and providing advantages over that of my previous invention referenced above. To that end, I provide control system 10 with a control valve 14 as depicted in FIGS. 2 and 2A hereof. The control valve 14 includes a multi-part housing 32, defining a bore 34. The remainder of the housing 32 serves to close one end of bore 34 so as to bound a chamber 36. Chamber 36 communicates with chamber 18 of the control system depicted in FIG. 1.

The housing 32 also defines a chamber 38 and a portion of the conduit 16 communicating pressurized fluid from source 12 thereto, as depicted by arrow 40. Interposing between chambers 36 and 38 is an axially movable annular seat assembly 42. A first annular carrier member 44 of seat assembly 42 threadably and sealingly engages housing 32, as at thread 46. A second annular seat member 48 is sealingly carried by carrier member 44 in a stepped through bore 50 of the latter. A combined retaining ring and spring member 52 engages both carrier 44 and seat 48 to ensure that the latter is captured in engagement with a shoulder 54 of bore 50. The bore 50 opens to chamber 36 to define an outlet port for the servo valve 14.

Movably extending through a bore 56 of seat member 48, the chamber 38, and an annular sealing member 58 carried by housing 32, is a stepped tubular elongate valve member 60. The valve member 60 defines a flared end portion 62 sealingly engaging the seat member 48 to define a first sealing diameter and area. A second generally cylindrically enlarged portion 63 of valve member 60 movably and sealingly engages sealing member 58 to define a second sealing diameter and area substantially matching the first area at member 60 and seat 48. A coil spring member 66 extends between carrier member 44 and an annular spring seat 68 to yieldably bias valve member 60 into sealing engagement with seat member 48. Because the valve member is pressure balanced as described above and is lightly spring loaded into a closed seated sealing position in engagement with seat member 48, the inlet passage 16 and chamber 38 are normally closed from fluid communication with chamber 36.

The housing 32 defines a vent chamber 70 receiving an end part of the valve member 60, and a vent passage 72 opening outwardly therefrom to ambient. A spherical valve member 74 is movably received within a spaced apart annular plurality of guide fingers 76 (only two of which are visible viewing FIG. 2) to sealingly engage valve member 60 in chamber 70. A lower end 78 of a vertically reciprocable input member 80 engages the valve member 74 to urge the latter into sealing engagement with the valve member 60 to define a third sealing diameter and effective area substantially equal to the earlier-described first and second effective areas.

Input member 80 carries an annular magnetic armature portion 82 juxtaposed with an opposed pair of spaced apart pole pieces 84,86 of a magnetic stator element also including a radially extending portion 87. Each of the stator element pole pieces 84,86 is associated with a respective one of a pair of electromagnetic windings 88,90, having input signal conductors 92 extending therefrom externally of the valve 14. In order to establish a centered position for the input member 80 wherein valve member 60 sealingly engages seat 48 and valve member 74 is seated upon valve member 60, an opposed pair of springs 94,96, extend therefrom to the housing 32. The spring 96 seats upon a relatively movable seat portion 98 of housing 32. An adjusting member 100 threadably engages the housing 32 and bears upon seat portion 98 to allow convenient setting of the desired centered-valve seated position of input member 80 with the preload of spring 96 slightly exceeding that of spring 94.

With reference now more particularly to FIG. 2A, it is seen that housing 32 defines a stepped bore 102 extending from the vent chamber 70 oppositely to valve member 60. A stepped piston portion 104 of input member 80 is sealingly and movably received in the bore 102. A pair of spaced apart sealing members, the first an o-ring 106, and the second an annular diaphragm 108, sealingly cooperate with the housing 32 and piston portion 104 to define an annular chamber 114, and to sealingly separate an annular chamber 116 from chambers 114 and 70. The chamber 116 is defined within housing 32 by a cavity 118 extending radially outwardly of input member 80, and is bounded by an o-ring seal 120 sealingly cooperating with a comparatively small diameter portion of input member 80.

Further, the housing 32 defines a passage 122 opening at its lower end to chamber 36, and thereby communicating with outlet port 50. At its upper end, the passage 122 communicates with chamber 116 via a restrictive orifice 124. A branch passage 126 communicates chamber 114 with chamber 36 via passage 122. Thus, the fluid pressure prevailing within chamber 114 always corresponds with that at outlet port 50, while the fluid pressure in chamber 116 corresponds to that at port 50 under static or slowly changing conditions.

The stepped piston member 104 is seen to define an opposed pair of annular face areas 128,130 respectively exposed to fluid pressure in chambers 116 and 114. The effective area of face 128 is significantly greater than that of the previously-described and substantially equal first, second, and third areas defined by valve members 60,74, and sealing member 58. On the other hand, the oppositely disposed annular face 130 of piston member 104 is substantially equal to the difference in area between that of face 128 and the first, second, and third areas of the valve members.

Having described the structure of servo valve 14, attention may now be directed to its operation. Fluid pressure source 12 provides pressurized fluid via conduit 16 to chamber 38. During operation of the system 10, valve 14 will have communicated pressure fluid to chamber 18 via outlet port 50 so that a comparatively lower fluid pressure prevails in chambers 18,36,114 and 116. Chamber 70 is communicated to ambient pressure via passage 72. With the valve members 60 and 74 both seated, the valve member 60 is pressure balanced and biased into sealing engagement with seat member 48. The valve member is urged upwardly, viewing the drawing figures, by fluid pressure in chamber 36 communicated by valve member 60. On the other hand, fluid pressures within chambers 114 and 116 equal that within chamber 36, and the area of face 128 on piston portion 104 exceeds that of face 130 by an area substantially equal to the sealing area of valve member 74 on valve member 60. Consequently, the valve member 74 is urged into sealing engagement with valve member 60 by the slightly greater preload of spring 96 over spring 94. Such pressure balancing of the servo valve 14 prevails for static conditions of pressure at outlet port 50, and also generally applies for relatively slow rates of pressure change upward or downward at the outlet port.

However, if operation of the solenoid valve results in more rapidly changing fluid pressure at the outlet port 50, the pressure balancing described above does not apply. For example, if the coil 88 is energized to draw the armature 82 downwardly, the input member 80 forces valve members 74 and 60 downwardly to unseat the latter from seat 48. As a result, pressure fluid flows from inlet conduit 16 to outlet port 50 to increase the fluid pressure thereat. The rate of increase of fluid pressure at outlet port 50 will depend on a multitude of parameters including, but not limited to, the volume and initial pressure level of conduit 20 and chamber 18. Fluid pressure in chamber 114 will closely follow that at outlet port 50. However, because of the orifice 124 and its own volume, the fluid pressure in chamber 116 lags behind pressure at port 50 approximately as a first time derivative of the latter. As a result, the input member 80 is urged upwardly by a feedback force the product of an area and fluid pressure (face 130 plus the second sealing area at member 58), and is urged downwardly by a product of pressure and area. The downward force is created by face 128 and the relatively lower fluid pressure prevailing in chamber 116 as this pressure lags behind the pressure at outlet port 50.

In view of the above, the input force is seen to be opposed during dynamic operation of solenoid valve 14 by a feedback force approximating a first time derivative of pressure at outlet port 50. Because of the comparatively larger areas defined on piston portion 104, the feedback force so created has an improved force margin over static and dynamic frictions of the solenoid valve 14.

Easily seen in view of the above, is the fact that in the event the input member 80 is moved upward by energization of coil 90 to unseat valve member 74 from member 60 venting of pressure from chambers 36 and 18 will result. In this case, the higher pressure prevailing in chamber 116 prior to starting of such venting results in a downward feedback force on the input member 80. As the pressure in chamber 116 is bled off via orifice 124 in response to decreasing pressure at outlet port 50, the feedback force effective on input member 80 also approximates a first time derivative of pressure at port 50. In all cases, the dynamic feedback force effective within servo valve 14 enjoys a significant force margin over static and dynamic frictions of the servo valve and is approximately a first time derivative of the fluid pressure at outlet port 50.

Figure 3:
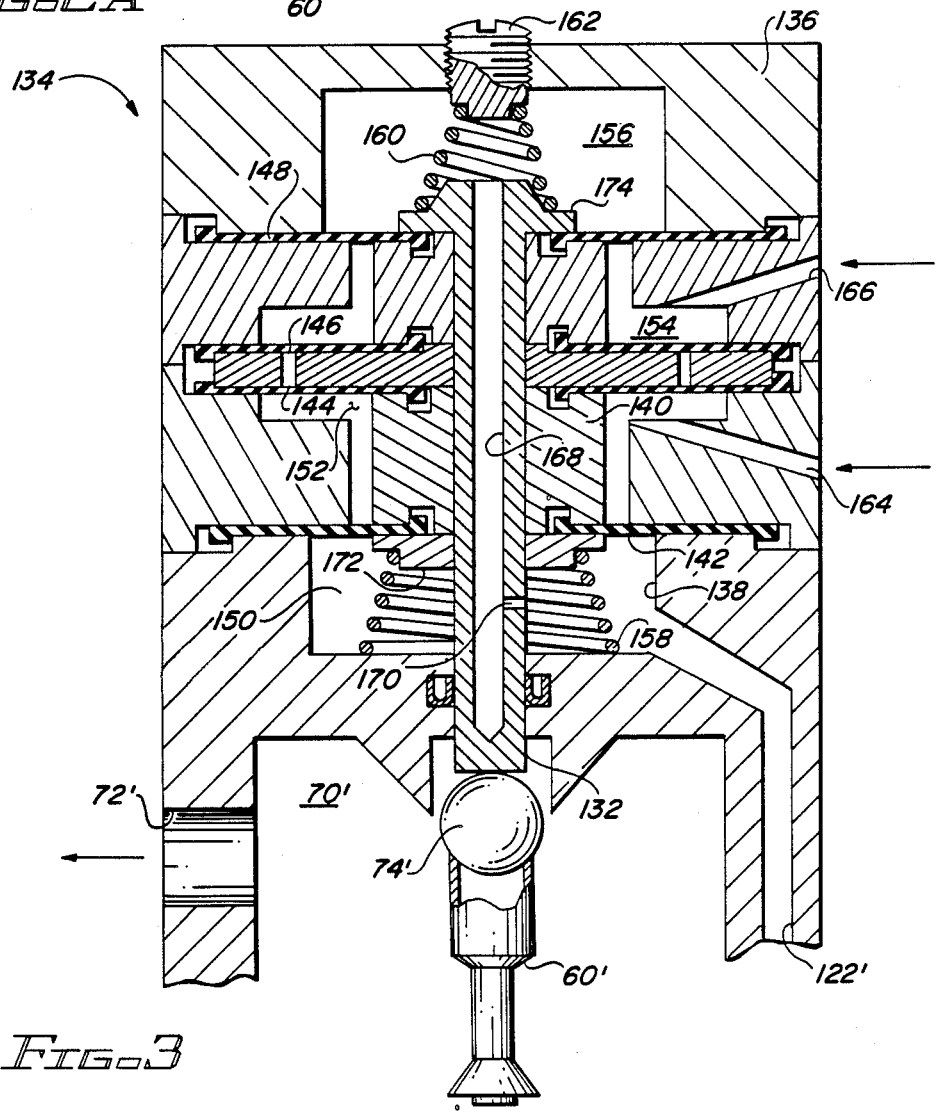
FIG. 3 presents a somewhat schematic fragmentary representation of an alternative embodiment of a control valve portion of a control system embodying the invention.

FIG. 3 depicts an alternative embodiment of the invention wherein the structural and functional details of the valve portions of the apparatus are assumed to be the same as that depicted by FIGS. 2 and 2A. In order to promote continuity of description, certain parts of the embodiment of FIG. 3 which are the same in structure or function as parts of FIGS. 2 and 2A are referenced with the same numeral used previously and having a prime added. However, the embodiment of FIG. 3 contemplates a fluid pressure differential input signal in contrast to the electrical input signal employed by the embodiment described above. In order to move an input member 132 of the servo valve 134, a housing 136 defines a stepped bore 138 opening to a vent chamber 70'. A stepped piston portion 140 of the input member 132 is movably carried centrally within the bore 138 cooperatively by four annular diaphragm members 142–148 which each sealingly engage both the housing 136 and the stepped piston portion 140 of input member 132. The diaphragm members 142–148 cooperate with housing 136 and input member 132 to define four chambers 150–156. Within chamber 150 a spring 158 extends between piston portion 140 and housing 136 to urge the input member 132 upwardly. A spring 160 in chamber 156 extends between the piston portion 140 and a spring seat member 162. The spring seat member 162 threadably and sealingly engages housing 136 to allow convenient adjustment of the input member 132 and valve members 60',74' to a closed-centered position.

Housing 136 defines a passage 122' communicating chamber 150 with the outlet port (not illustrated) of the servo valve 134. Similarly, housing 136 defines passages 164,166 opening outwardly from chambers 152,154, respectively, to receive fluid pressure differential input signals. The input member 132 defines a central blind passage 168 opening to chamber 156. A restrictive orifice 170 defined by the input member 132 communicates passage 168 with chamber 150.

During operation the servo valve 134 receives fluid pressure differential input signals, or pressures, via the passages 164,166. In the event the fluid pressure in chamber 154 is sufficiently greater than that in chamber 152, the input member is moved downwardly to supply pressurized fluid from a source to an outlet port of the solenoid valve, similar to the operation described with reference to FIGS. 2 and 2A. Of course, if fluid pressure in chamber 152 is the greater, input member 132 is moved upwardly to vent fluid pressure to ambient.

When input member 132 is moved downwardly, increasing fluid pressure substantially equal to that at the outlet port is communicated via passage 122' to chamber 150. This fluid pressure exerts an upwardly directed feedback force on the stepped piston portion 140 by exertion upon an annular face 172 thereof. Pressure fluid from chamber 150 is communicated via orifice 170 to passage 168 and chamber 156 at a rate which approximates a first time derivative of fluid pressure at the outlet port. That is, the fluid pressure in chamber 156 lags behind that in chamber 150 while fluid pressure at the outlet port is dynamically increasing. This fluid pressure in chamber 156 exerts a downwardly directed feedback force upon a face 174 of the input member.

As a consequence of the above, the input force exerted upon input member 132 by the fluid pressure differential between chambers 152 and 154 is resisted by a feedback force approximately a first time derivative of increasing fluid pressure at the outlet port. Because the stepped piston portion 140 of input member 132 provides feedback faces 172,174 which are significantly greater in area than the sealing areas defined by valve members 60',74', the feedback force so exerted enjoys a favorable force margin over static and dynamic frictions effective within the solenoid valve 134.

It will be further understood that if the input member 132 is moved upwardly to vent pressure fluid via vent port 72' decreasing pressure prevails in chamber 150. Pressure fluid in chamber 156 will also decrease with time as fluid is vented, approximately as a first time derivative. That is, the fluid pressure in chamber 156 will dynamically exceed that in chamber 150 to exert a downwardly directed feedback force on input member 132 opposing the input force.

Having depicted and described my invention in sufficient detail to allow one ordinarily skilled in the pertinent art to make and use the invention, I desire to protect the same in accord with applicable law. While my invention has been depicted and described by reference to two particularly preferred embodiments thereof, such reference does not imply a limitation upon the invention, and no such limitation is to be inferred. The invention is to be limited only by the spirit and scope of the appended claims which also provide additional disclosure and definition of the invention.

I claim:

1. Servo valve apparatus comprising:
   a housing defining an inlet port, an outlet port, a vent port, and a flow path communicating each port with the others;
   a pair of relatively movable valve members movably received by said housing, a first of said pair of valve members sealingly cooperating in a first position to close fluid communication between said inlet port and said outlet port while defining a respective first sealing area, said first valve member further sealingly and movably cooperating with said housing to close fluid communication between said inlet port and said vent port while defining a second sealing area substantially equal with said first sealing area, said first valve member in a respective second position opening fluid communication between said inlet port and said outlet port, said first valve member further defining a passage communicating said outlet port with said vent port;

a second of said pair of valve members in a respective first position thereof sealingly cooperating with said first valve member to close said passage and fluid communication between said outlet port and said vent port while defining a third sealing area substantially equal to said first and said second sealing areas, said second valve member moving to a respective second position opening fluid communication between said outlet port and said vent port via said passage;

input means for moving either selected one of said pair of valve members to said respective second position thereof;

feedback means for urging said selected one of said pair of valve members from said second position toward the respective first position thereof substantially as a first time derivative of fluid pressure at said outlet port, said feedback means defining a pair of concentric oppositely disposed faces, a first of said pair of faces defining an area significantly exceeding said first, second, and third sealing areas individually and being disposed to urge said second valve member from its respective second position toward said first position thereof in response to fluid pressure thereon, the other of said pair of faces defining an area substantially equal to the area difference between said first face area and said first, second, and third sealing areas individually, said other face being disposed to exert a force tending to allow movement of said first valve member from its second position toward said first position thereof in response to fluid pressure thereon, and flow path means freely communicating fluid pressure from said outlet port to said other face and restrictively communicating to said first face fluid pressure from said outlet port according to a first time derivative thereof;

said input means comprising a magnetic armature position and a spaced apart pair of electromagnetic stator means for moving said armature portion from a respective first centered position wherein said pair of valve members both occupy their respective first positions alternatively to respectively opposite second and third position wherein a selected one of said pair of valve members is moved to its respective second position;

said feedback means including a stepped piston portion sealingly cooperating with said housing to define a pair of chambers and said pair of oppositely disposed faces respectively bounding individually a respective one of said pair of chambers; and said input means carrying said stepped piston portion intermediate of said armature portion and an end of said input means which operatively contacts one of said pair of valve members.

2. The invention of claim 1 wherein said input means is elongate to define another end opposite said end which operatively cooperates with said one valve member, a first preloaded coil spring circumscribing said input member and engaging the latter adjacent said armature portion to extend therefrom to a spring seat portion of said housing, a second preloaded coil spring circumscribing said other end of said input member and engaging the latter adjacent said armature portion to extend therefrom oppositely to said first spring in opposition thereto, a second spring seat member adjustably movably carried by said housing and reacting said second spring, whereby selective adjustment of said second spring seat member relative said housing is effective to balance the spring preloads of said first and said second coil springs.

3. Servo valve apparatus comprising a housing defining a flow path interconnecting an inlet port, an outlet port, and a vent port, valve means received in said flow path for in a first position closing communication from said inlet port to both said outlet port and vent port and in a second position communicating said inlet port only with said outlet port and in a third position communicating said outlet port only with said vent port, said valve means defining a determined sealing diameter area upon which fluid pressure is effective to urge said valve means from said first position toward one of said second and third position thereof, input means for selectively moving said valve means from said first position alternatively to either one of said second and third positions thereof, said input means further defining feedback means for defining a feedback area significantly exceeding said determined sealing diameter area and urging movement of said valve means from either of said second or third position toward said first position thereof in response to fluid pressure effective thereon, and means communicating to said feedback area fluid pressure from said outlet port substantially as a first time derivative of fluid pressure level at the latter for effect upon said feedback area, said feedback means further defining another feedback area oppositely disposed with respect to said feedback area and substantially equaling in area the difference between said feedback area and said determined sealing diameter area, and means freely communicating fluid pressure from said outlet port to said another feedback area, said input means comprising electromagnetic means for effecting movement of said valve means alternatively to one of said second and third positions in response to an electrical input signal applied thereto, said electromagnetic means comprising a magnetic armature position drivingly connected with an input member for movement in unison therewith, said input member operatively associating with said valve means, said feedback means comprising a stepped piston member drivingly connected with said input member for movement in unison therewith, said stepped piston member sealingly cooperating with said housing to define said feedback area and said another feedback area on opposite faces thereof, said input member being elongate, said stepped piston member connecting with said input member intermediate of said magnetic armature portion and an end of said input member operatively associating with said valve means.

4. The invention of claim 3 wherein said servo valve apparatus includes a pair of preloaded oppositely acting spring members urging said input member to a centered position wherein said valve means occupies said first position thereof, a first of said pair of spring members being carried upon said input member intermediate said stepped piston and said armature portion, and the other of said spring members extending from adjacent said armature portion to a spring seat member, said housing movably carrying said spring seat member, whereby adjusting movement of said spring seat member relative to said housing is effective to select the balance of preloads of said pair of spring members.

* * * * *